US012062309B2

(12) United States Patent
Jeong

(10) Patent No.: US 12,062,309 B2
(45) **Date of Patent: *Aug. 13, 2024**

(54) DEVICE AND METHOD FOR DETECTING SCREEN FREEZE ERROR OF DISPLAY OF VEHICLE

(71) Applicant: HYUNDAI MOBIS CO., LTD., Seoul (KR)

(72) Inventor: Woo Young Jeong, Bucheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,138

(22) Filed: Sep. 26, 2023

(65) Prior Publication Data

US 2024/0021116 A1 Jan. 18, 2024

Related U.S. Application Data

(63) Continuation of application No. 17/664,369, filed on May 20, 2022, now Pat. No. 11,961,434.

(51) Int. Cl.
*G09G 3/00* (2006.01)

(52) U.S. Cl.
CPC ....... *G09G 3/006* (2013.01); *G09G 2320/029* (2013.01); *G09G 2380/10* (2013.01)

(58) Field of Classification Search
CPC ............. G09G 3/006; G09G 2320/029; G09G 2380/10; G09G 2330/08; G09G 2330/12; G09G 2354/00; G09G 5/003; G09G 3/20; G09G 3/2096; B60K 35/00; B60K 37/00; B60K 2370/152
See application file for complete search history.

(56) References Cited

U.S. PATENT DOCUMENTS

| | | | | |
|---|---|---|---|---|
| 7,502,076 | B2 | 3/2009 | Xiu | |
| 10,319,333 | B2 | 6/2019 | Tripathi | |
| 10,460,638 | B2 | 10/2019 | Abbott | |
| 11,131,987 | B2 | 9/2021 | Wang | |
| 11,373,567 | B2 | 6/2022 | Gerdes | |
| 11,455,201 | B2 | 9/2022 | Kim | |
| 11,961,434 | B2 * | 4/2024 | Jeong ....................... | G09G 3/20 |
| 2006/0256119 | A1 | 11/2006 | Xiu | |

(Continued)

FOREIGN PATENT DOCUMENTS

KR 10-2021-0047770 4/2021

OTHER PUBLICATIONS

Korean Office Action dated Aug. 23, 2023 issued in KR 10-2022-0010896.

(Continued)

*Primary Examiner* — Michael J Jansen, II
(74) *Attorney, Agent, or Firm* — DLA Piper LLP US

(57) ABSTRACT

A device and method for detecting a screen freeze error of a display of a vehicle. The method comprises monitoring a drive pattern of at least one pixel in a porch area during a time period corresponding to a plurality of image frames, wherein the porch area including at least one of a front porch area and a back porch area of a display panel driven according to the plurality of image frames; and determining occurrence of a screen freeze error by comparing the drive pattern of the at least one pixel with a preset drive pattern.

7 Claims, 11 Drawing Sheets

(56) References Cited

U.S. PATENT DOCUMENTS

| | | | | |
|---|---|---|---|---|
| 2014/0085275 | A1 | 3/2014 | Tripathi | |
| 2017/0213526 | A1 | 7/2017 | Hara | |
| 2018/0315363 | A1 | 11/2018 | Abbott | |
| 2019/0286115 | A1 | 9/2019 | Wang | |
| 2021/0233444 | A1 | 7/2021 | Gerdes | |
| 2021/0406108 | A1 | 12/2021 | Kim | |
| 2023/0237941 | A1 * | 7/2023 | Jeong ........................ | G09G 3/20<br>345/204 |
| 2024/0021116 | A1 * | 1/2024 | Jeong ........................ | G09G 3/20 |

OTHER PUBLICATIONS

English Language Abstract of KR 10-2021-0047770 published Apr. 30, 2021.

* cited by examiner

DEVICE AND METHOD FOR DETECTING SCREEN FREEZE ERROR OF DISPLAY OF VEHICLE

CROSS-REFERENCE TO RELATED APPLICATION

This application is a continuation of U.S. application Ser. No. 17/664,369 filed May 20, 2022, which claims priority to and the benefit of Korean Patent Application No. 10-2022-0010896, filed on Jan. 25, 2022. The disclosures of which are incorporated herein by reference in their entirety.

TECHNICAL FIELD

The present disclosure relates to a method and device for detecting a screen freeze error of a display device of a vehicle.

BACKGROUND

The content described below merely provides background information related to the present disclosure and does not constitute the prior art.

In general, a display device is provided in a vehicle to provide driving information of the vehicle or multimedia contents to an occupant of the vehicle.

As an example, the display device may be disposed in a cluster.

The cluster may provide vehicle information, such as vehicle speed, revolutions per minute (RPM), mileage, fuel condition, external temperature, fuel efficiency, warning message, gear condition, tire pressure, ADAS (Advanced Driver Assistance System) information, and lamp status, using a display panel of the display device.

As another example, the display device may be linked with a navigation device. The navigation device may provide a current location of the vehicle, a destination, and a route to the destination by using the display panel of the display device. In addition, the display device may provide an image captured by a rear camera.

The vehicle display device converts vehicle information into image data or video data, and provides a plurality of image frames to the occupant using the display panel. Here, the image data or video data may be composed of a plurality of image frames. Each image frame may be generated for each preset unit time.

Since the display device mainly provides information on safety of the vehicle, an error in the display device may threaten the safety of the vehicle. For example, the screen of the display device of the vehicle may freeze. When the screen of the display device freezes, it is difficult for the occupant to notice the safety problem of the vehicle.

The screen freeze of the display device may be caused during generation or transmission of an image frame. As an example, an image frame may be generated identically to a previous image frame or no image frame may be generated from a specific point in time due to an error. As another example, no image frame may be transmitted to a driver circuit of the display panel from a specific point in time due to an error, or a previous image frame other than a current image frame may be transmitted to the driver circuit of the display panel.

Due to the screen freeze of the display device, the previous image frame may be continuously output on the screen of the display device. The failure to update the screen of the display device such as the above is referred to as a screen freeze error. The previous image frame that is continuously output may be referred to as a freeze frame.

However, the screen freeze of the display device may occur intentionally rather than by error. For example, specifically, image frames generated from a specific point in time may be intentionally generated to be identical. The display device continuously outputs image frames generated at different time points, but the screen of the display device may appear to be frozen. The output image frames are normal image frames, not still frames.

If the screen freeze of the display device is caused by error, it is necessary to warn the occupant of the error. However, if the screen freeze of the display device is made intentionally, there is no need to warn the occupant.

Accordingly, it should be possible to distinguish whether the screen freeze of the display device is caused by error or intentionally.

SUMMARY

According to at least one aspect, the present disclosure provides a device and a method for detecting a screen freeze error of a display of a vehicle. The method comprises monitoring a drive pattern of at least one pixel in a porch area during a time period corresponding to a plurality of image frames, wherein the porch area including at least one of a front porch area and a back porch area of a display panel driven according to the plurality of image frames; and determining occurrence of a screen freeze error by comparing the drive pattern of the at least one pixel with a preset drive pattern.

According to at least another aspect, the present disclosure provides a method for assisting detection of a screen freeze error of a display device in a vehicle. The method comprises generating a plurality of image frames including pixel data to be displayed by at least one pixel in a porch area including at least one of a front porch area and a back porch area of a display panel, wherein the at least one pixel has a drive pattern when the display panel is driven according to the plurality of image frames; and providing the plurality of image frames to a driver circuit of the display panel.

According to at least another aspect, the present disclosure provides a device for detecting a screen freeze error of a display device in a vehicle. The device comprises a monitoring unit configured to monitor a drive pattern of at least one pixel in a porch area during a time period corresponding to the plurality of image frames, wherein the porch area including at least one of a front porch area or a back porch area of a display panel driven according to a plurality of image frames; and a determining unit configured to determine occurrence of a screen freeze error by comparing the drive pattern of the at least one pixel with a preset drive pattern.

According to at least another aspect, the present disclosure provides an assistance device for assisting detection of a screen freeze error of a display device in a vehicle. The assistance device comprises a generating unit configured to generate a plurality of image frames including pixel data to be displayed by at least one pixel in a porch area including at least one of a front porch area or a back porch area of a display panel, wherein the at least one pixel has a drive pattern when the display panel is driven according to the plurality of image frames; and a providing unit configured to provide the plurality of image frames to a driver circuit of the display panel.

DETAILED DESCRIPTION

Figure 1:
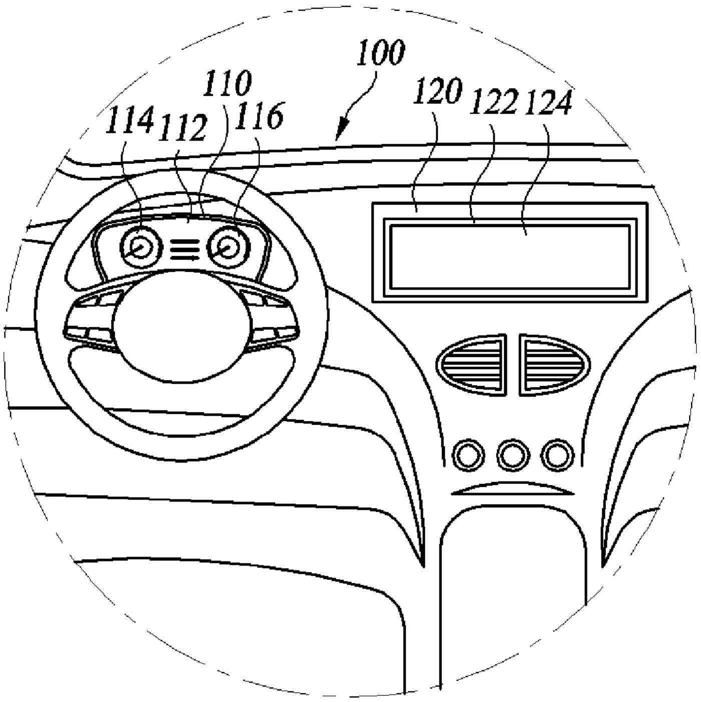
FIG. 1 is a view showing a part of an internal configuration of a vehicle according to one embodiment of the present disclosure.

The present disclosure provides a method and device for detecting a screen freeze error of a display device in a vehicle capable of determining occurrence of a screen freeze of the display device.

Further, the present disclosure provides a method and device for detecting a screen freeze error of a display device in a vehicle capable of determining whether the screen freeze of the display device is intentionally generated or caused by an error.

The problems to be solved by the present disclosure are not limited to the problems mentioned above, and other problems not mentioned will be clearly understood by those skilled in the art from the following description.

Hereinafter, some embodiments of the present disclosure will be described in detail with reference to exemplary drawings. With regard to the reference numerals of the components of the respective drawings, it should be noted that the same reference numerals are assigned to the same components even though they are shown in different drawings. In addition, in describing the present disclosure, a detailed description of a well-known configuration or function related to the present disclosure, which may obscure the subject matter of the present disclosure, will be omitted.

In addition, terms, such as "first", "second", "i)", "ii)", "a)", "b)", or the like, may be used in describing the components of the present disclosure. These terms are intended only for distinguishing a corresponding component from other components, and the nature, order, or sequence of the corresponding component is not limited by the terms. In the specification, when a unit 'includes' or 'is provided with' a certain component, it means that other components may be further included, without excluding other components, unless otherwise explicitly stated.

Each component of the device or method according to the present disclosure may be implemented as hardware or software, or a combination of hardware and software. In addition, the function of each component may be implemented as software and a microprocessor may execute the function of software corresponding to each component.

FIG. 1 is a view showing a part of an internal configuration of a vehicle according to one embodiment of the present disclosure.

Referring to FIG. 1, a dashboard 100, a cluster frame 110, a first display panel 112, a speed indicating object 114, an RPM indicating object 116, a center fascia frame 120, a bezel 122, and a second display panel 124 are shown.

The dashboard 100 serves as a partition for partitioning the interior of the vehicle and an engine room, and is disposed at a front side in the interior of the vehicle. The cluster frame 110, the first display panel 112, the center fascia frame 120, the bezel 122, and the second display panel 124 may be disposed on the dashboard 100.

Electronic components for controlling the first display panel 112 and the second display panel 124 may be installed inside the dashboard 100. The electronic components may include at least one of a semiconductor chip, a switch, an integrated circuit, a resistor, a volatile memory, a nonvolatile memory, and a printed circuit board.

The first display panel 112 may output a graphic object including vehicle information to an occupant in the vehicle. For example, the first display panel 112 may output the speed indicating object 114 and the RPM indicating object 116. Furthermore, the first display panel 1120 may output visually vehicle information such as a vehicle mileage, fuel state, external temperature, fuel efficiency, warning message, gear state, tire pressure, ADAS (Advanced Driver Assistance System) information, lamp state, or the like.

The first display panel 112 may be fixed to the dashboard 100 through the cluster frame 110.

The first display panel 112 and the cluster frame 110 may be referred to as a cluster.

The second display panel 124 may output a graphic object including various information. For example, the second display panel 124 may output navigation information including a current location of the vehicle, a route to a destination, and map information. Furthermore, the second display panel 124 may output multimedia contents.

The second display panel 124 may be fixed to the dashboard 100 through the center fascia frame 120 and the bezel 122.

The first display panel 112 and the second display panel 124 may be implemented as various types of display panels such as a liquid crystal display (LCD) panel, a thin film transistor liquid crystal display (TFT-LCD) panel, a light emitting diode (LED) panel or an organic light emitting diode (OLED) panel, or the like.

The vehicle may include a head-up display panel disposed on a front glass or a display panel disposed at a rear side of a headrest in addition to the dashboard 100.

Figure 2:
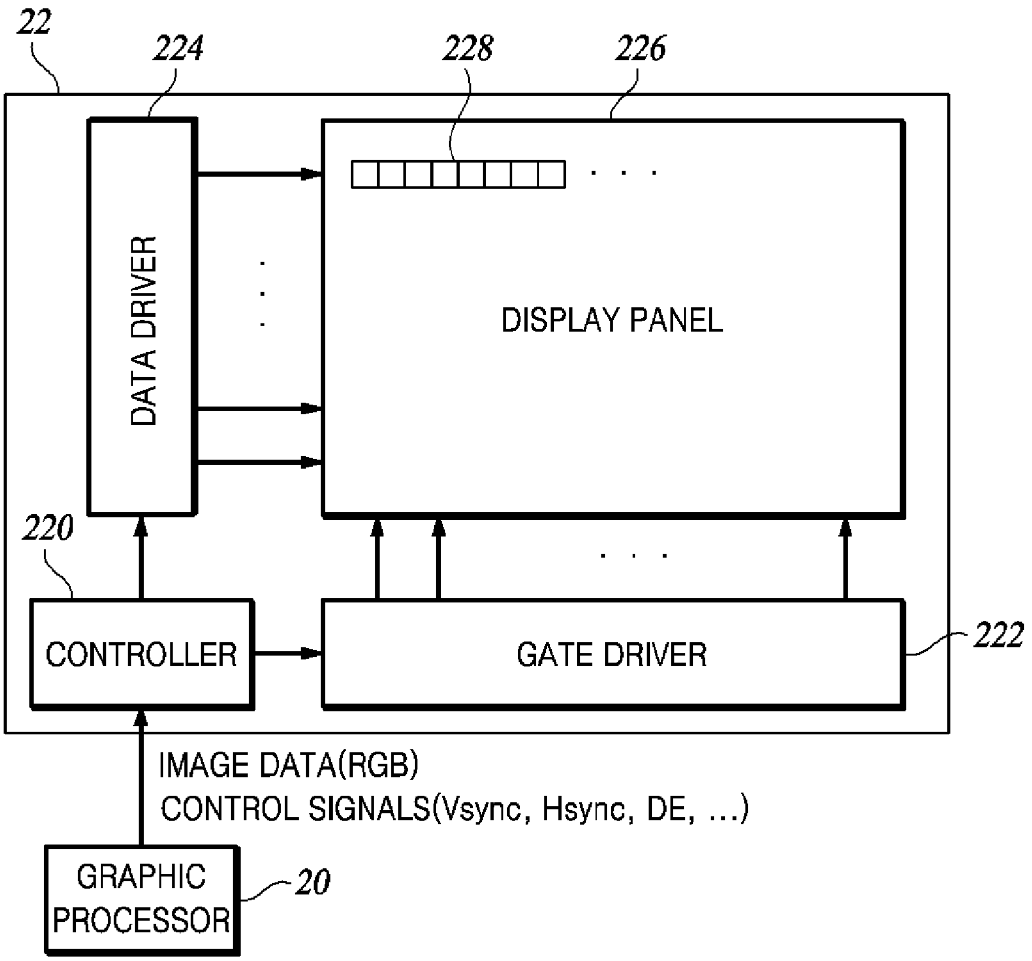
FIG. 2 is a block diagram showing the configuration of a vehicle display system according to one embodiment of the present disclosure.

FIG. 2 is a block diagram showing the configuration of a vehicle display system according to one embodiment of the present disclosure.

Referring to FIG. 2, a graphics processor 20, a display device 22, a controller 220, a gate driver 222, a data driver 224, a display panel 226 and pixels 228 are shown.

The graphics processor 20 generates a plurality of image frames based on vehicle information, and sequentially transmits the plurality of image frames to the display device 22. The display device 22 visually outputs a plurality of image frames through the display panel 226. The display device 22 may output a plurality of image frames in accordance with a preset frame per second (FPS).

Here, the image frame includes image data and control signals. The image data includes RGB (Red, Green, Blue) values of the pixels 228 in the display panel 226. The control signals are signals for controlling the pixels 228 in the display panel 226. The control signals may be referred to as timing signals. The image data and the control signals are described in detail in FIG. 3.

To generate a plurality of image frames, the graphics processor 20 may receive vehicle information from an external device. In this case, the external device may include a CPU (Central Processing Unit), a GPU (Graphics Processing Unit), an ECU (Engine Control Unit), a TCU (Transmission Control Unit), an EPS (Electric Power Steering), an ABS (Anti-lock Brake System), an ADAS (Advanced Driver Assistance System), and the like.

The graphics processor 20 may generate a plurality of image frames based on LVDS Display Interface (LDI), which is an interface standard. The LDI is a communication interface between a display source that provides display data and a display device that outputs the display data. Besides, the graphics processor 20 may use MIPI-CSI scheme.

Meanwhile, the display device 22 includes the controller 220, the gate driver 222, the data driver 224, the display panel 226, and the pixels 228. The display device 22 may further include a power management integrated circuit.

The controller 220 receives the plurality of image frames, and controls the gate driver 222 and the data driver 224 to display images according to the plurality of image frames on the display panel 226.

The controller 220 may control the time at which the image data and the control signals are transmitted to the gate driver 222 and the data driver 224. The controller 220 may be referred to as a timing controller.

The controller 220 may convert image data included in each image frame into a data signal according to a signal format of the data driver 224, and control the data driver 224 using the converted data signal.

In order to control the data driver 224, the controller 220 may output various data control signals (DCS) including a source start pulse (SSP), a source sampling clock (SSC), a source output enable signal (SOE), and the like to the data driver 224.

The source start pulse SSP controls the operation start timing of one or more source driver integrated circuits constituting the data driver 224. The source sampling clock SSC is a clock signal that controls sampling timing of data in each of the source driver integrated circuits. The source output enable signal SOE controls the output timing of the data driver 224.

In order to control the gate driver 222, the controller 140 may transmit various gate control signals (GCS) including a gate start pulse (GSP), a gate shift clock (GSC), a gate output enable signal (GOE), and the like to the gate driver 222.

The gate start pulse GSP controls the operation start timing of one or more gate driver integrated circuits constituting the gate driver 222. The gate shift clock GSC is a clock signal which is commonly input to one or more gate driver integrated circuits and controls the shift timing of the gate pulse. The gate output enable signal GOE specifies timing information of one or more gate driver integrated circuits.

The controller 220 may transmit signals to the gate driver 222 and the data driver 224 using a mini-LVDS (Low Voltage Differential Signaling) method.

The gate driver 222 sequentially drives a plurality of gate lines by sequentially transmitting gate control signals to the plurality of gate lines.

The gate driver 222 may include one or more gate driver integrated circuits.

The data driver 224 drives a plurality of data lines by supplying data voltages to the plurality of data lines.

When a specific gate line among the plurality of gate lines is opened, the data driver 224 converts image data into analog data voltages and supplies the data voltages to the plurality of data lines.

The data driver 224 may include one or more data driver integrated circuits.

The display panel 226 includes pixels 228 in a pixel area defined based on the data lines and the gate lines. The pixels 228 may have a pixel array structure.

The display panel 226 displays a plurality of image frames using the pixels 228 under the control of the gate driver 222 and the data driver 224.

Each of the pixels 228 includes a first electrode, a second electrode, and a light emitting element. The light emitting element emits light according to a voltage applied to the first electrode and the second electrode. The type of the display panel 226 may be determined according to the first electrode, the second electrode, and the light emitting element.

Meanwhile, the LVDS transmission standard may be applied to communication between the graphics processor 20 and the display device 22 and communication between the components in the display device 22.

Figure 3:
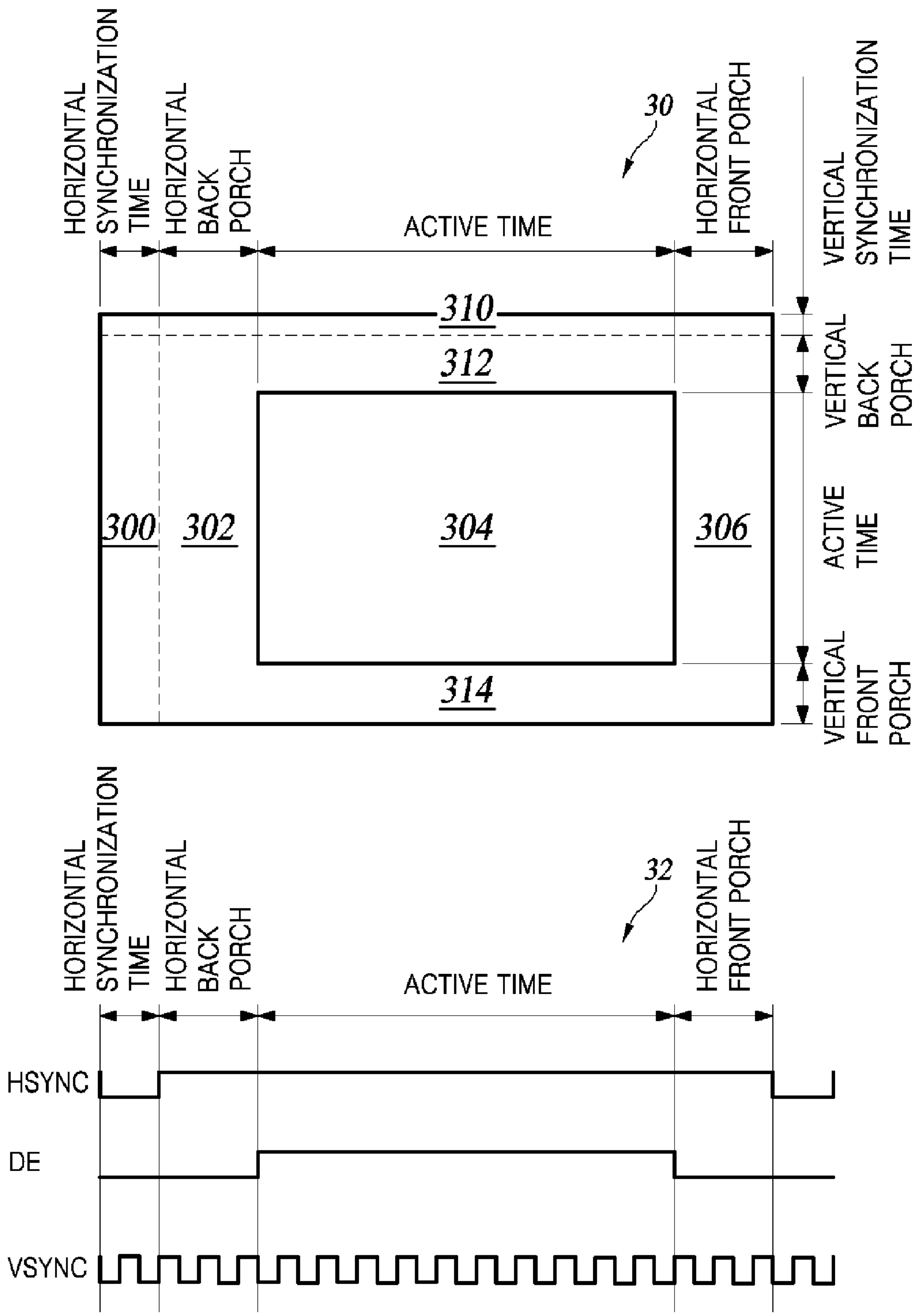
FIG. 3 is a diagram for explaining display timing according to one embodiment of the present disclosure.

FIG. 3 is a diagram for explaining display timing according to one embodiment of the present disclosure.

Referring to FIG. 3, a display panel 30, a horizontal synchronization area 300, a horizontal back porch area 302, an active area 304, a horizontal front porch area 306, a vertical synchronization area 310, and a vertical back porch area 312, a vertical front porch area 314 and a timing chart 32 are shown.

The display panel 30 includes the active area 304 and a blank area. The blank area includes the horizontal synchronization area 300, the horizontal back porch area 302, the horizontal front porch area 306, the vertical synchronization area 310, the vertical back porch area 312, and the vertical front porch area 314.

The active area 304 is an area in which image data of one frame is displayed among pixels of the display panel 30 on which the image frames are displayed. The pixels in the active area 304 may represent RGB values.

The data driver converts image data into data voltages during the active time, and supplies the data voltages to the pixels in the active area 304 through the data lines. The gate driver may supply a gate pulse or a scan pulse synchronized with the data voltage to the gate lines during the active time.

The blank area indicates an area excluding the active area 304 in the display panel 30.

A time period corresponding to one frame includes an active time and a blank time. The active time means a time during which the active area 304 is activated. The blank time represents a time excluding the active time from a time section corresponding to one frame image.

The control signals representing timing signals are applied to pixels in the blank area. In one embodiment of the present disclosure, the pixels in the blank area may receive image data as well as the control signals including a data enable signal DE. That is, the data enable signal DE may be turned on during the blank time.

Meanwhile, the timing chart 32 shows a horizontal synchronization signal HSYNC, the data enable signal DE, and a vertical synchronization signal VSYNC.

The horizontal synchronization signal HSYNC serves as a start reference of one image frame of the display panel 30. The horizontal synchronization signal HSYNC is a signal defining one image frame period of the display panel 30.

The period of the pulse of the horizontal synchronization signal HSYNC may be set to be one image frame period. One image frame frequency according to one image frame period may be referred to as a display frame rate. The horizontal synchronization signal HSYNC may be used to determine a horizontal position of a displayed image.

The time period of the horizontal synchronization signal HSYNC includes a horizontal synchronization time, a horizontal back porch, a horizontal front porch, and an active time. The back porch and the front porch are set before and after the ON period of the data enable signal DE.

The vertical synchronization signal VSYNC is a signal that determines one vertical period required to write data to the pixels of one line in the display panel 30. That is, the period of the pulse of the vertical synchronization signal VSYNC may be set to be one vertical period.

The data enable signal DE has a pulse timing at which image data is output to the active area 304. A high logic period of the data enable signal DE indicates a one-line data input timing. When the ON period of the data enable signal DE is activated, image data is displayed on the display panel 30. One pulse period of the data enable signal DE is a horizontal address time required to write data to the pixels of one line in the display panel 30.

Figure 4:
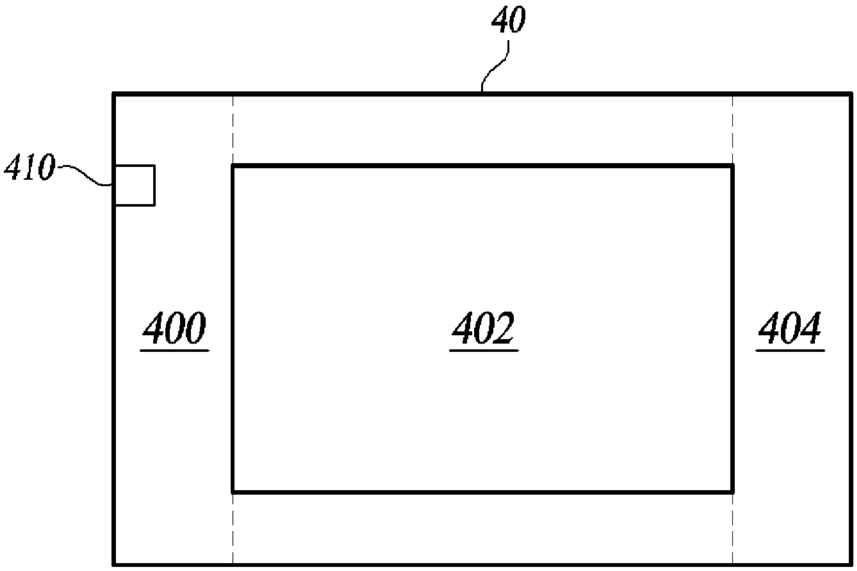
FIG. 4 is a diagram illustrating an image frame according to one embodiment of the present disclosure.

FIG. 4 is a diagram illustrating an image frame according to one embodiment of the present disclosure.

Referring to FIG. 4, an image frame 40 includes an active area 402, a back porch area 400, a front porch area 404, and pixel data 410.

The active area 402 is an area in which information requested by the occupant is displayed. The active area 402 may include a plurality of pixels, and provide information to an occupant through the plurality of pixels.

The back porch area 400 and the front porch area 404 are areas to which a control signal is output. An area including at least one of the back porch area 400 and the front porch area 404 may be referred to as a porch area.

The porch area includes a plurality of pixels, like the active region 402. In FIG. 4, the back porch area 400 includes pixel data for one pixel. The pixel data 410 is pixel data related to a specific pixel in the back porch area 400.

According to the prior art, a plurality of pixels in the porch area are driven only by a control signal. However, according to one embodiment of the present disclosure, pixels in the porch area may be driven according to pixel data including image data as well as a control signal. That is, the pixel data 410 may include both the image data and the control signal.

For example, pixels in the image frame 40 may emit light according to the pixel data 410. The pixel may emit light in various colors such as red, green, blue, or white according to the pixel data 410. The pixel may perform a flicker operation on each of the plurality of image frames according to pixel data in the porch area. That is, the pixel may be driven according to a preset drive pattern.

Meanwhile, image data and control signals may be identified and processed in unit of frame data. For example, in the case of an image frame having a frame rate of 60 Hz, one data frame corresponds to 16.6 ms and the control signals are identified and processed every 16.6 ms.

Figure 5:
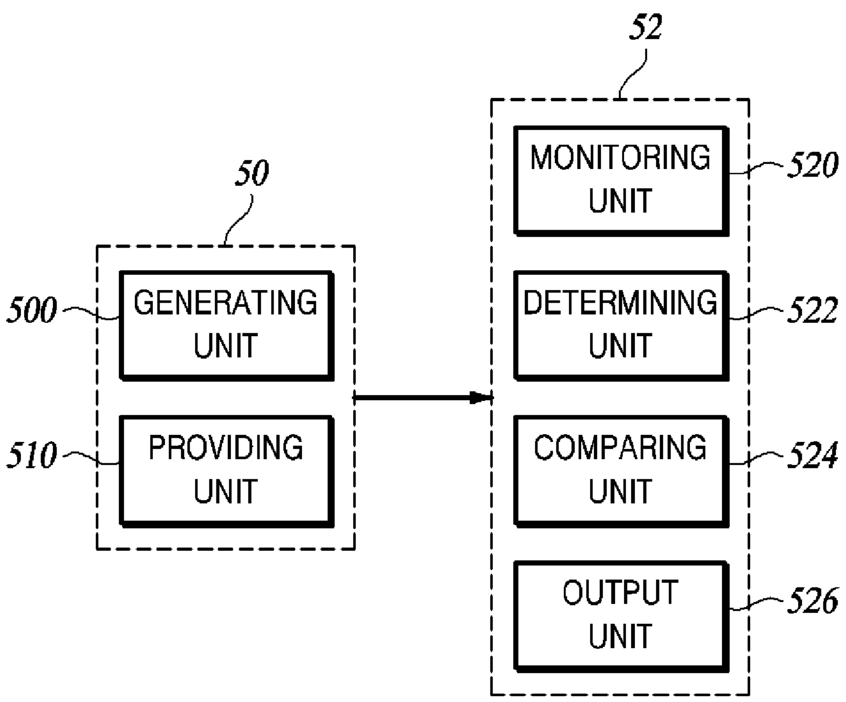
FIG. 5 is a block diagram showing the configurations of a generating device and a detecting device according to one embodiment of the present disclosure.

FIG. 5 is a diagram showing the configuration of a generating device and a detecting device according to one embodiment of the present disclosure.

Referring to FIG. 5, the generating device 50 includes a generating unit 500 and a providing unit 510. The detecting device 52 may include at least one of a monitoring unit 520, a determining unit 522, a comparing unit 524, and an output unit 526.

The generating device 50 is a device for assisting detection of a screen freeze error of a display device in a vehicle. The generating device 50 generates a plurality of image frames and transmits the plurality of image frames to the detecting device 52.

The detecting device 52 is a device for detecting a screen freeze error of a display device in a vehicle. The detecting device 52 may receive a plurality of image frames and detect a still frame among the plurality of image frames. The detecting device 52 may detect a still frame based on a drive pattern of a preset pixel in the porch area.

Furthermore, the detecting device 52 may perform image decoding and image error checking. In addition, the detecting device 52 may perform an image analysis function or an image correction function. Also, the detecting device 52 may receive an image serial signal converted from the image data and the control signal, and separate the image data and the control signal from the serial signal by using a deserializer. The detecting device 52 may be referred to as a T-con, bridge, or GDC IC.

The generating device 50 and the detecting device 52 may be integrated into one device or separated into separate devices. When the generating device 50 and the detecting device 52 are separated, the generating device 50 includes a serializer and the detecting device 52 includes a deserializer. Further, the generating device 50 is electrically connected to the detecting device 52.

The generating device 50 may be connected to a plurality of detecting devices. The generating device 50 may generate an image frame for each detecting device. For example, the generating device 50 may generate an image frame for a head-up display, an image frame for AVN (Audio, Video, Navigation), an image frame for a cluster, and an image frame for multimedia.

Hereinafter, the generating device 50 will be described in detail.

FIGS. 2 and 5, the generating device 50 may correspond to the graphics processor 20. Alternatively, the generating device 50 may be implemented as an external device other than the graphics processor 20.

The generating device 50 may be referred to as an MCU or MICOM.

Referring back to FIG. 5, the generating unit 500 generates a plurality of image frames including pixel data related to at least one pixel in the porch area of the display panel of the display device. Each image frame includes pixel data related to at least one pixel in the porch area. Pixel data is represented by at least one pixel.

In this case, the at least one pixel may be determined according to a preset position and a preset number among the pixels in the porch area. That is, the generating unit 500 may generate an image frame including pixel data related to at least one predetermined pixel.

The generating unit 500 may generate a plurality of image frames so that at least one pixel is driven according to a preset drive pattern during a time period corresponding to the plurality of image frames. The generating device 50 and the detecting device 52 share a preset drive pattern.

Specifically, the display panel is driven according to the plurality of image frames generated by the generating unit 500. Pixels in the display panel are driven according to pixel data included in the plurality of image frames. In particular, at least one pixel in the porch area is also driven according to the pixel data included in the plurality of image frames. During a time period corresponding to the plurality of image frames, at least one pixel may have a preset drive pattern. As an example, the preset drive pattern may include a pattern in which pixels flicker in red at a predetermined flicker period.

The providing unit 510 provides a plurality of image frames.

In the case that the detecting device 52 corresponds to the controller of the display device, the providing unit 510 may provide a plurality of image frames to the detecting device 52.

In case that the detecting device 52 does not correspond to the controller of the display device, the providing unit 510 may provide a plurality of image frames to the driver circuit of the display panel. Specifically, the providing unit 510 may provide a plurality of image frames to at least one of the controller, the gate driver, and the data driver of the display device. Furthermore, the providing unit 510 may separately provide the plurality of image frames to the detecting device 52.

Hereinafter, the detecting device 52 will be described in detail.

Referring to FIGS. 2 and 5, the detecting device 52 may correspond to the controller 220. Alternatively, the detecting device 52 may be implemented as an external device other than the controller 220.

The monitoring unit 520 monitors the drive pattern of at least one pixel in the porch area of the display panel driven according to the plurality of image frames during a time period corresponding to the plurality of image frames. Otherwise, the monitoring unit 520 may monitor the drive pattern of at least one pixel during a time period corresponding to at least one of the plurality of image frames.

In this case, the at least one pixel may be determined according to a preset position and a preset number among the pixels in the porch area. In other words, the monitoring unit 520 may monitor the drive pattern of at least one preset pixel. The at least one pixel may correspond to pixel data generated by the generating unit 500. For example, the generating unit 500 may generate pixel data related to a preset pixel, and the monitoring unit 520 may monitor driving of the preset pixel.

When the detecting device 52 corresponds to the controller 220, the detecting device 52 receives a plurality of image frames from the generating device 50. The monitoring unit 520 may monitor at least one pixel drive pattern based on the plurality of image frames.

When the detecting device 52 is an external device, the detecting device 52 may receive a plurality of image frames from the generating device 50. Alternatively, when the detecting device 52 is an external device, the monitoring unit 520 may monitor a drive pattern of at least one pixel by sensing voltages of the pixels in the display panel.

The determining unit 522 determines the occurrence of a screen freeze error by comparing the drive pattern of at least one pixel with a preset drive pattern.

When the drive pattern of the at least one pixel corresponds to the preset drive pattern, the determining unit 522 may determine that no screen freeze error has occurred.

On the other hand, when the drive pattern of the at least one pixel does not correspond to the preset drive pattern, the determining unit 522 may determine that a screen freeze error has occurred.

In one embodiment, the preset drive pattern includes at least one of an RGB value of the at least one pixel or a flicker period of the at least one pixel. For example, when at least one pixel is driven according to a plurality of image frames, in case that the at least one pixel displays an RGB value different from a preset RGB value, the determining unit 522 may determine that a screen freeze error has occurred. As another example, in case that the at least one pixel is driven with a flicker period different from a preset flicker period, the determining unit 522 may determine that a screen freeze error has occurred. As still another example, in case that the at least one pixel does not perform a preset flicker operation, the determining unit 522 may determine that a screen freeze error has occurred.

In another embodiment, the preset drive pattern includes a preset flickering order of a plurality of pixels including the at least one pixel in the porch area. The determining unit 522 determines occurrence of a screen freeze error by comparing a flickering order of the plurality of pixels with the preset flickering order. For example, when a first pixel and a second pixel in the porch area do not alternately flicker, the determining unit 522 may determine that a screen freeze error has occurred.

In still another embodiment, when the discrepancy between the flicker of the at least one pixel and the flicker according to the preset drive pattern occurs more than a preset number of times, the determining unit 522 may determine that a screen freeze error has occurred.

The output unit 526 outputs a warning in accordance with the occurrence of a screen freeze error. When it is determined that a screen freeze error has occurred, the output unit 526 may output a warning to the occupant visually, audibly, or tactually. For example, the output unit 526 may output a warning screen on the display panel.

Meanwhile, the detection device 52 may determine whether a blackout occurs on the screen of the display device. Here, the blackout of the screen indicates that all pixels in the active area of the display panel are turned off or that the pixels display a black RGB value.

Specifically, the monitoring unit 520 monitors a drive pattern of at least one pixel. The determining unit 522 may determine the blackout of the screen based on the drive pattern of the at least one pixel.

In one embodiment, when at least one pixel displays an RGB value different from a preset RGB value, it may be determined that the screen of the display device is blackout. For example, when at least one pixel displays an unspecified RGB value different from a preset RGB value, the determining unit 522 may determine that the screen of the display device is blackout.

In one embodiment, when at least one pixel displays a specific RGB value, the determining unit 522 may determine that the screen of the display device is black. For example, when at least one pixel displays a black RGB value, the determining unit 522 may determine that the screen of the display device is blackout. As another example, when at least one pixel displays a black RGB value after being driven according to a preset drive pattern, the determining unit 522 may determine that the screen of the display device is blackout. As still another example, when a pixel flickers in black at a preset position despite a preset drive pattern including flickering red, the determining unit 522 may determine that the screen of the display device is blackout.

In another embodiment, when at least one pixel displays a specific RGB value during a time period corresponding to at least one image frame, the determining unit 522 may determine that the screen of the display device is blackout. For example, when at least one pixel continuously displays a black RGB value during a time period corresponding to three image frames, the determining unit 522 may determine that the screen of the display device is blackout. In other words, when at least one pixel is off for a preset time or off for a preset number of image frames, the determining unit 522 may determine that the screen of the display device is blackout.

The detecting device 52 may determine the blackout of the screen before detecting the screen freeze error of the display device. Alternatively, the detecting device 52 may detect the screen freeze error before determining the blackout of the screen of the display device. Meanwhile, the detecting device 52 may detect only a screen freeze error, detect only a blackout of the screen, or detect both a screen freeze error and a blackout of the screen.

When it is determined that the screen is blackout, the detecting device 52 may output a warning to the occupant.

Meanwhile, according to one embodiment of the present disclosure, before detecting a screen freeze error, the detecting device 52 may determine whether at least one pixel is driven among the pixels in the porch area. That is, the determination of the screen freeze error by the determining unit 522 may be performed after it is determined that there is a driven pixel in the porch area. To this end, the detecting device 52 may receive a plurality of image frames from the graphics processor.

Specifically, the comparing unit 524 may compare at least one of RGB information or cyclic redundancy check (CRC) information of the pixels in the porch area with a preset value. The preset value may be at least one of a preset RGB value or a preset CRC value.

As an example, the comparing unit 524 may compare the RGB value of each pixel in the porch area with the preset RGB value. When at least one pixel has an RGB value greater than the preset RGB value, the comparing unit 524 may determine that there is a driven pixel in the porch area. The preset RGB value may be (0, 0, 0).

As another example, the comparing unit 524 may compare a CRC value of pixel data of the pixels in the porch area with the preset CRC value. Here, the CRC value is a bit string of a specific length representing the remainder after dividing a polynomial given as a data string by a predetermined specific polynomial. The CRC value may be calculated by an algorithm such as CRC-32. A further description of the CRC value will be omitted since it is obvious to those skilled in the art. Meanwhile, the preset CRC value may be stored in advance or received from the generating device 50. If the CRC value of the pixel data of the pixels in the porch area is different from the preset CRC value, the comparing unit 524 may determine that there is a driven pixel in the porch area.

Based on the comparison result of the comparing unit 524, the monitoring unit 520 may monitor a drive pattern of at least one pixel in the porch area.

Figure 6A:
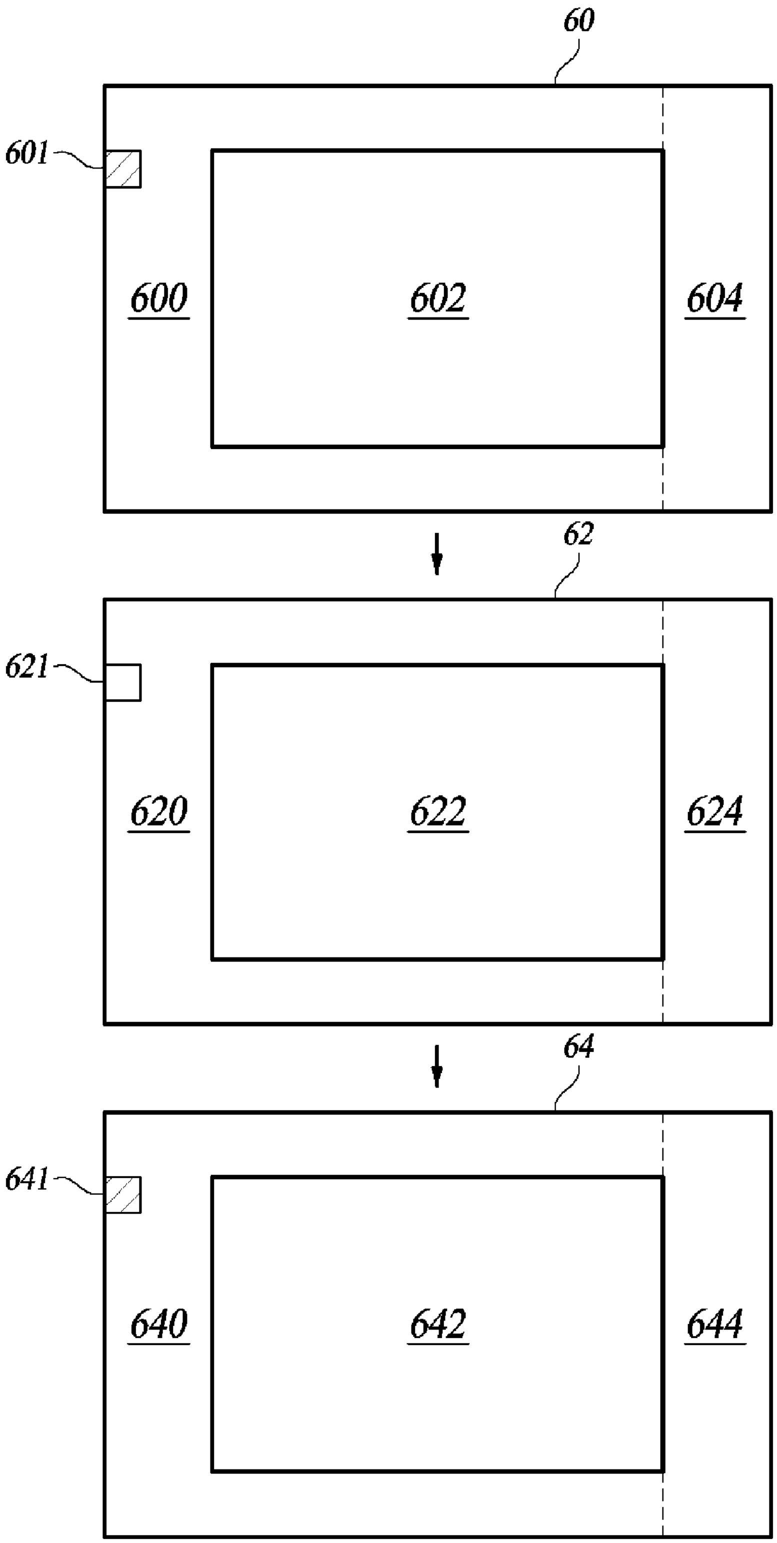
FIG. 6A is a diagram illustrating a preset drive pattern of a specific pixel in a porch area according to one embodiment of the present disclosure.

FIG. 6A is a diagram illustrating a preset drive pattern of a specific pixel in a porch area according to one embodiment of the present disclosure.

Referring to FIG. 6A, a first image frame 60, a second image frame 62 and a third image frame 64 are shown.

The first image frame 60 includes a first back porch area 600, a first active area 602, a first front porch area 604, and first pixel data 601. The second image frame 62 includes a second back porch area 620, a second active area 622, a second front porch area 624, and second pixel data 621. The third image frame 64 includes a third back porch area 640, a third active area 642, a third front porch area 644, and third pixel data 641.

The display panel may sequentially output the first image frame 60, the second image frame 62, and the third image frame 64.

The first pixel data 601, the second pixel data 621, and the third pixel data 641 are pixel data related to one specific pixel. The specific pixel may have a drive pattern according to the first pixel data 601, the second pixel data 621, and the third pixel data 641.

The preset drive pattern of the specific pixel may be a flicker pattern.

Specifically, when the specific pixel is driven according to the preset drive pattern, the specific pixel may emit light according to the first pixel data 601. Then, the specific pixel may not emit light according to the second pixel data 621. Next, the specific pixel may emit light according to the third pixel data 641. The preset flicker period of the specific pixel is a time interval corresponding to three image frames.

As such, as the preset drive pattern of the specific pixel, the flicker pattern may be set.

The generating device may generate the first image frame 60, the second image frame 62, and the third image frame 64 so that the specific pixel has the preset flicker pattern.

Figure 6B:
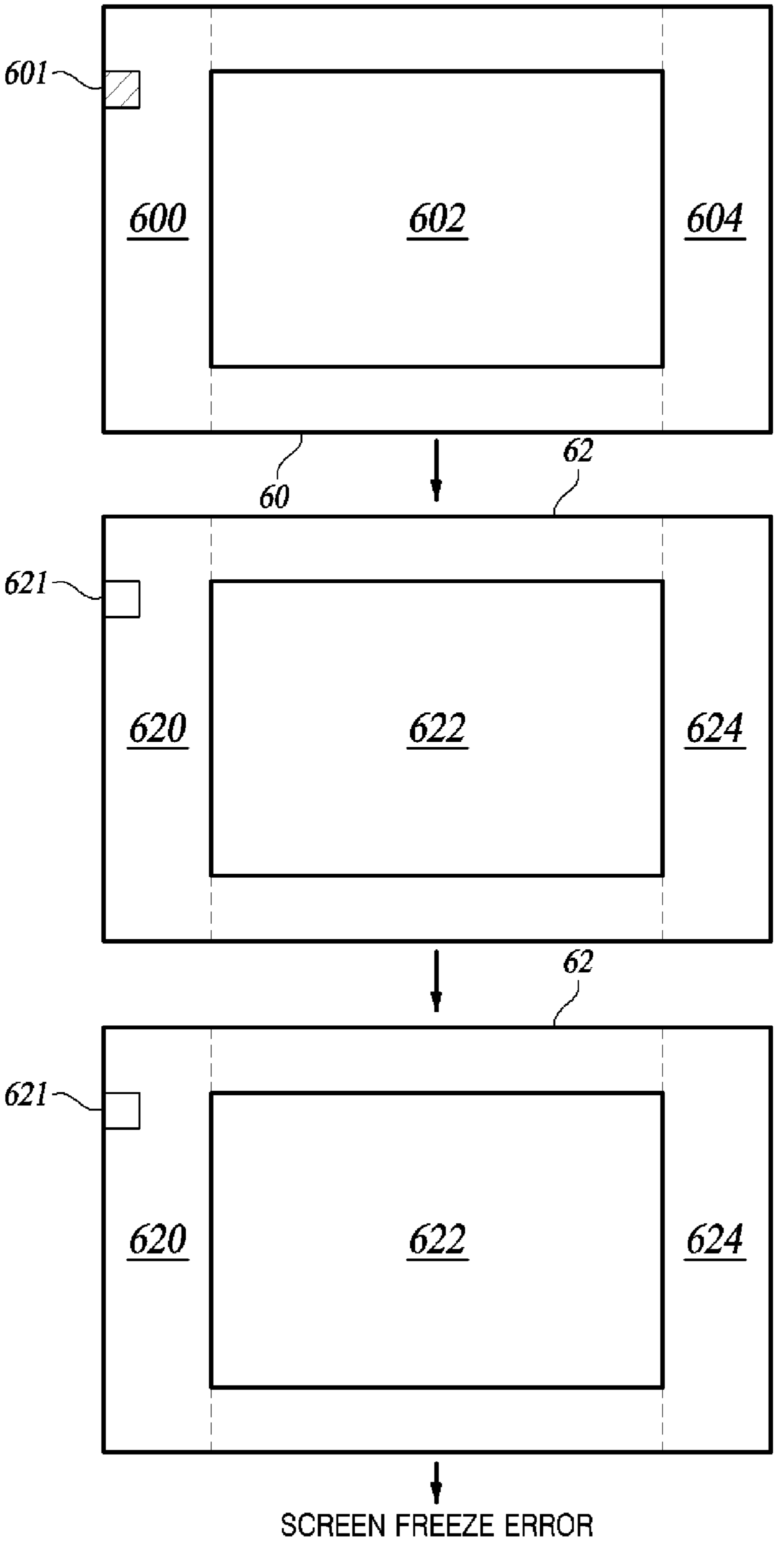
FIG. 6B is a diagram illustrating a process of detecting a screen freeze error according to one embodiment of the present disclosure.

FIG. 6B is a diagram illustrating a process of detecting a screen freeze error according to one embodiment of the present disclosure.

Referring to FIGS. 6A and 6B, the first image frame 60 and the second image frame 62 are shown.

The detecting device may receive the first image frame 60 as the first image frame, and receive the second image frame 62 as the second image frame.

Then, due to an error, the detecting device may receive, as the third image frame, an image frame having the same active area as the active area 622 of the second image frame.

In this case, it needs to be determined whether the reception of the third image frame having the same active area as the active area 622 of the second image frame is due to an error or intentional. If the reception of the third image frame is due to an error, a screen freeze error has occurred.

The detecting device according to one embodiment of the present disclosure may determine the occurrence of a screen freeze error by comparing the drive pattern of a specific pixel in the porch area with a preset drive pattern.

Specifically, the preset flicker period of the specific pixel is a time interval corresponding to three image frames. That is, according to the preset drive pattern, the specific pixel should emit light in the third image frame. However, according to the drive pattern of the specific pixel monitored by the detecting device, the specific pixel does not emit light in the third image frame. Accordingly, the detecting device may determine that a screen freeze error has occurred in the third image frame.

In this way, the detecting device can determine the occurrence of the screen freeze of the display device. In particular, the detecting device can determine whether the screen freeze of the display device is generated intentionally or caused by an error.

Figure 7A:
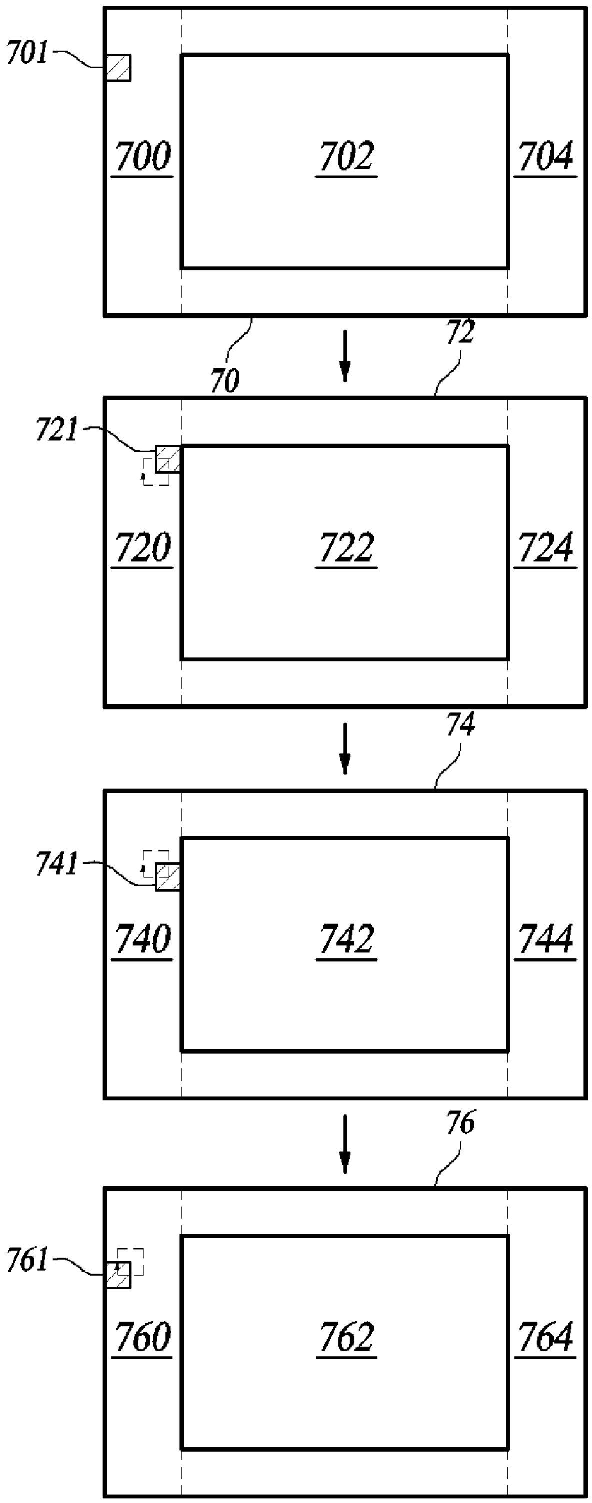
FIGS. 7A and 7B are examples of a preset drive pattern according to one embodiment of the present disclosure.
Figure 7B:
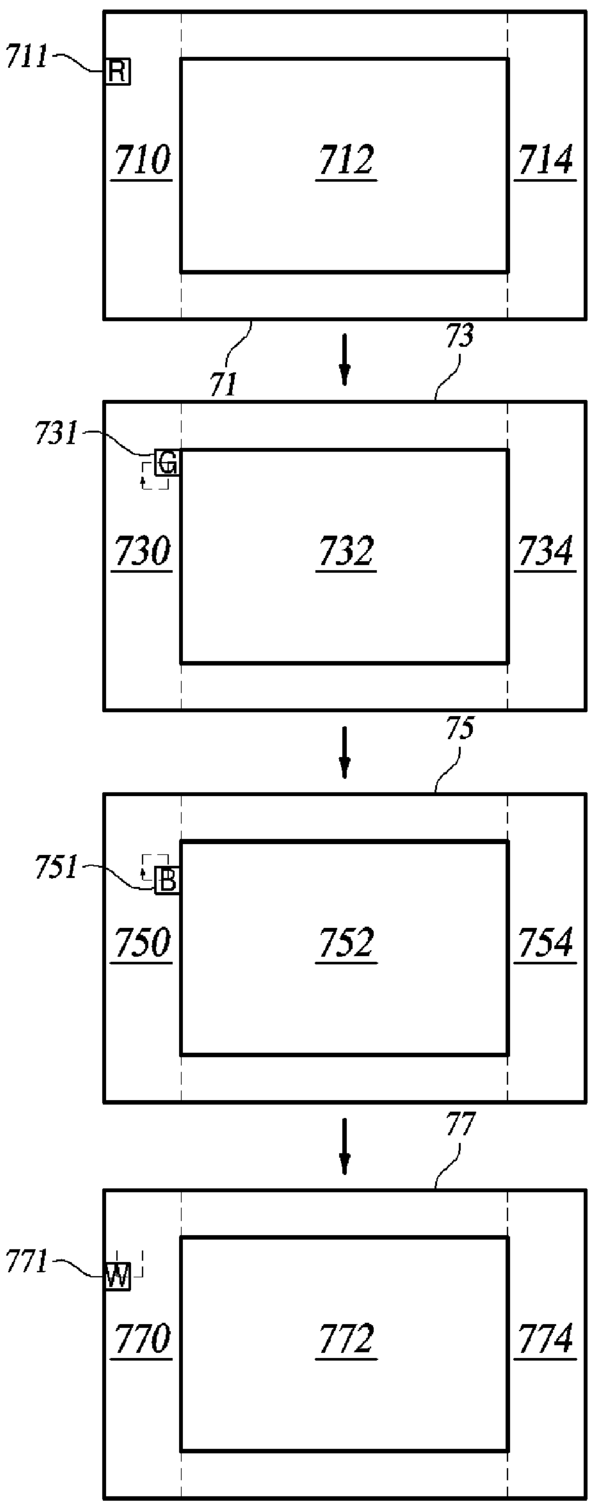

FIGS. 7A and 7B are examples of a preset drive pattern according to one embodiment of the present disclosure.

Referring to FIG. 7A, a first image frame 70, a second image frame 72, a third image frame 74 and a fourth image frame 76 are shown.

The first image frame 70 includes a first back porch area 700, a first active area 702, a first front porch area 704, and first pixel data 701. The second image frame 72 includes a second back porch area 720, a second active area 722, a second front porch area 724, and second pixel data 721. The third image frame 74 includes a third back porch area 740, a third active area 742, a third front porch area 744, and third pixel data 741. The fourth image frame 76 includes a fourth back porch area 760, a fourth active area 762, a fourth front porch area 764, and fourth pixel data 761.

The display panel may sequentially output the first image frame 70, the second image frame 72, the third image frame 74, and the fourth image frame 76.

The first pixel data 701, the second pixel data 721, the third pixel data 741, and the fourth pixel data 761 are pixel data related to different pixels. A first specific pixel may have a drive pattern according to the first pixel data 701. A second specific pixel may have a drive pattern according to the second pixel data 721. A third specific pixel may have a drive pattern according to the third pixel data 741. A fourth specific pixel may have a drive pattern according to the fourth pixel data 761.

The drive pattern preset for the four specific pixels may be a pattern in which the first specific pixel, the second specific pixel, the third specific pixel, and the fourth specific pixel flicker sequentially. In this case, the preset flicker period of each of the first specific pixel, the second specific pixel, the third specific pixel, and the fourth specific pixel may be a time interval corresponding to four image frames.

The detecting device may determine the occurrence of a screen freeze error by comparing the monitored drive pattern for four specific pixels with a preset drive pattern.

Referring to FIG. 7B, the first image frame 71, the second image frame 73, the third image frame 75, and the fourth image frame 77 are illustrated.

The first image frame 71 includes a first back porch area 710, a first active area 712, a first front porch area 714, and first pixel data 711. The second image frame 73 includes a second back porch area 730, a second active area 732, a second front porch area 734, and second pixel data 731. The third image frame 75 includes a third back porch area 750, a third active area 752, a third front porch area 754, and third pixel data 751. The fourth image frame 77 includes a fourth back porch area 770, a fourth active area 772, a fourth front porch area 774, and fourth pixel data 771.

The display panel may sequentially output the first image frame 71, the second image frame 73, the third image frame 75, and the fourth image frame 77.

The first pixel data 711, the second pixel data 731, the third pixel data 751, and the fourth pixel data 771 are pixel data related to different pixels. A first specific pixel may have a drive pattern according to the first pixel data 711. A second specific pixel may have a drive pattern according to the second pixel data 731. A third specific pixel may have a drive pattern according to the third pixel data 751. A fourth specific pixel may have a drive pattern according to the fourth pixel data 771.

The drive pattern preset for the four specific pixels may be a pattern in which the first specific pixel, the second specific pixel, the third specific pixel, and the fourth specific pixel flicker sequentially. In this case, the preset flicker period of each of the first specific pixel, the second specific pixel, the third specific pixel, and the fourth specific pixel may be a time interval corresponding to four image frames. Furthermore, the preset RGB value of the first specific pixel may be a value representing red. The preset RGB value of the second specific pixel may be a value representing green. The preset RGB value of the third specific pixel may be a value representing blue. The preset RGB value of the fourth specific pixel may be a value representing white.

The detecting device may determine the occurrence of a screen freeze error by comparing the monitored drive pattern for four specific pixels with the preset drive pattern.

Figure 8:
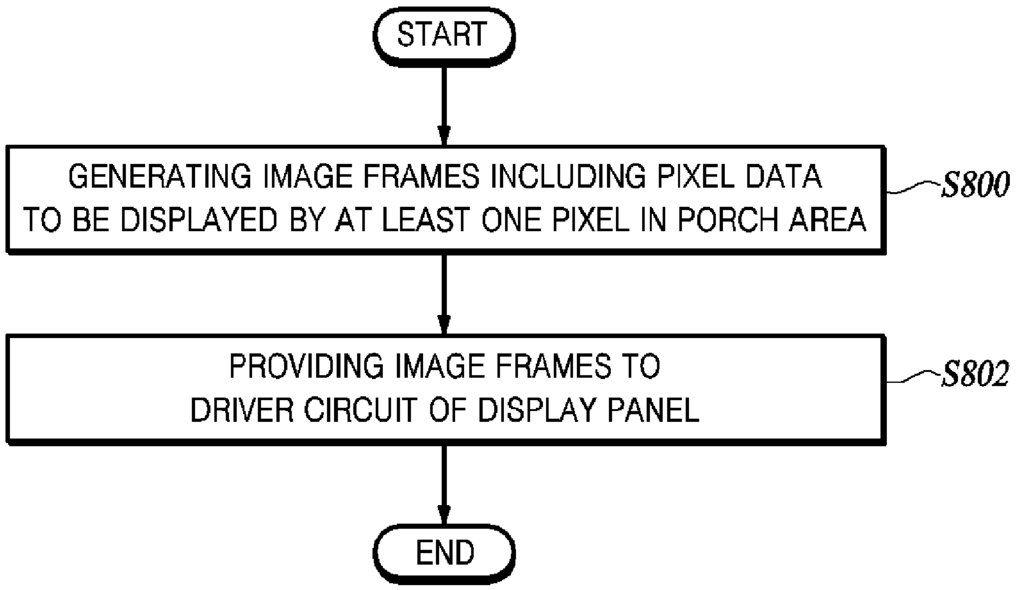
FIG. 8 is a flowchart illustrating an operation of the generating device according to one embodiment of the present disclosure.

FIG. 8 is a flowchart illustrating an operation of the generating device according to one embodiment of the present disclosure.

Referring to FIG. 8, the generating device generates a plurality of image frames including pixel data to be displayed by at least one pixel in the porch area (S800).

The at least one pixel may be determined according to a preset position and a preset number among the pixels in the porch area.

When the display panel is driven according to a plurality of image frames, at least one pixel has a drive pattern.

The generating device may generate a plurality of image frames such that at least one pixel is driven according to a preset drive pattern.

The drive pattern of the at least one pixel is monitored by the detecting device. The monitored drive pattern of the at least one pixel may be used to determine the occurrence of a screen freeze error through comparison with the preset drive pattern. In one embodiment, the preset drive pattern may include at least one of an RGB value of at least one pixel or a flicker period of the at least one pixel. In another embodiment, in case of a plurality of pixels, the preset drive pattern may include a flicker order of the plurality of pixels including the at least one pixel.

Meanwhile, the porch area includes at least one of the front porch area and the back porch area of the display panel.

The generating device provides the plurality of image frames to the driver circuit of the display panel (S802).

Figure 9:
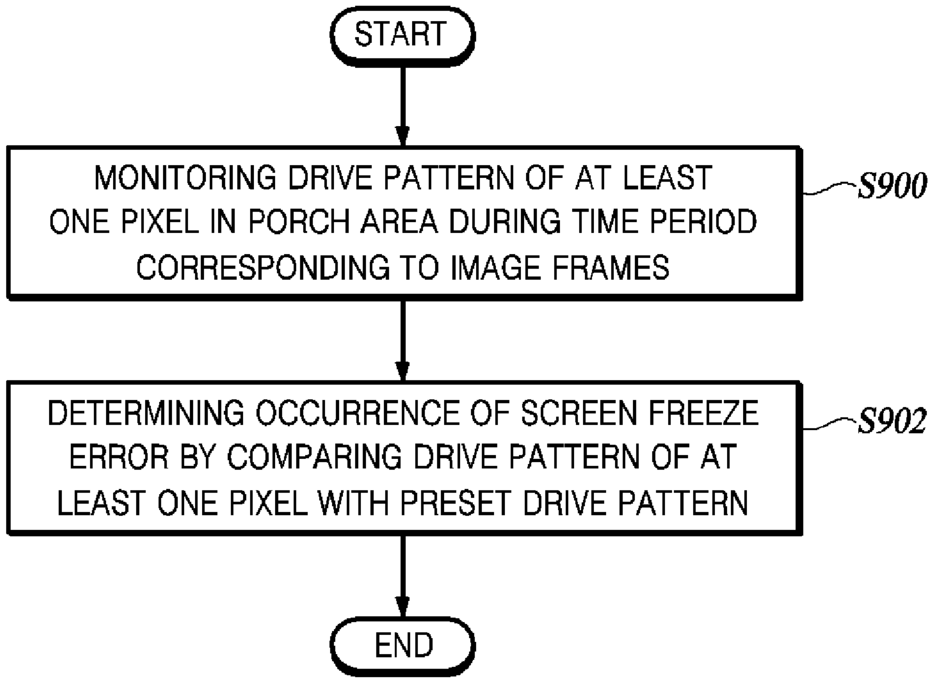
FIG. 9 is a flowchart illustrating an operation of the detecting device according to one embodiment of the present disclosure.

FIG. 9 is a flowchart illustrating an operation of the detecting device according to one embodiment of the present disclosure.

Referring to FIG. 9, the detecting device monitors a drive pattern of at least one pixel in the porch area of the display panel driven according to a plurality of image frames during a time period corresponding to the plurality of image frames (S900).

Here, the at least one pixel may be determined according to a preset position and a preset number among the pixels in the porch area. That is, the at least one pixel may be at least one preset pixel.

Meanwhile, the porch area includes at least one of the front porch area and the back porch area of the display panel.

The detecting device compares the drive pattern of the at least one pixel with a preset drive pattern to determine whether a screen freeze error occurs (S902).

Here, the preset drive pattern may include at least one of an RGB value of the at least one pixel or a flicker period of the at least one pixel. In case of a plurality of pixels, the preset drive pattern may include a flicker order of the plurality of pixels.

When the drive pattern of the at least one pixel does not correspond to the preset drive pattern, the detecting device may determine that a screen freeze error has occurred.

When the drive pattern of the at least one pixel corresponds to the preset drive pattern, the detecting device may determine that no screen freeze error has occurred.

Through the above-described process, the detecting device can detect a screen freeze error of the display device in the vehicle.

In one embodiment, the detecting device may output a warning in accordance with the occurrence of a screen freeze error.

In one embodiment, when at least one pixel displays an RGB value different from a preset RGB value, the detecting device may determine that the screen of the display device is blackout. In one embodiment, when at least one pixel displays a specific RGB value, the detecting device may determine that the screen of the display device is blackout.

In one embodiment, when at least one pixel displays a specific RGB value during a time period corresponding to at least one image frame, the detecting device may determine that the screen of the display device is blackout.

The determination of the blackout of the screen may be performed before or after step S902.

In one embodiment, the detecting device may compare at least one of RGB information or CRC information of the pixels in the porch area with a preset value to determine the existence of a pixel driven in the porch area. Before step S902, the detecting device may compare at least one of the RGB information or the CRC information of the pixels in the porch area with the preset value.

According to one embodiment, the method and device for detecting a screen freeze error of a display device in a vehicle can determine occurrence of a screen freeze of the display device.

According to one embodiment, the method and device for detecting a screen freeze error of a display device in a vehicle can determine whether the screen freeze of the display device is intentionally generated or caused by an error.

According to one embodiment, the method and device for detecting a screen freeze error of a display device in a vehicle can improve detection accuracy of a screen freeze error and reliability of information transmitted to an occupant in the vehicle.

Various implementations of the systems and techniques described herein may include digital electronic circuits, integrated circuits, field programmable gate arrays (FPGAs), application specific integrated circuits (ASICs), computer hardware, firmware, software, and/or a combination thereof. These various implementations may include an implementation using one or more computer programs executable on a programmable system. The programmable system includes at least one programmable processor (which may be a special purpose processor or a general-purpose processor) coupled to receive and transmit data and instructions from and to a storage system, at least one input device, and at least one output device. Computer programs (also known as programs, software, software applications or codes) contain instructions for a programmable processor and are stored in a "computer-readable recording medium".

The computer-readable recording medium includes all types of recording devices in which data readable by a computer system are stored. The computer-readable recording medium may include non-volatile or non-transitory, such as ROM, CD-ROM, magnetic tape, floppy disk, memory card, hard disk, magneto-optical disk, and storage device, and may further include a transitory medium such as a data transmission medium. In addition, the computer-readable recording medium may be distributed in a network-connected computer system, and the computer-readable codes may be stored and executed in a distributed manner.

Although it is described that each process is sequentially executed in the flowchart/timing diagram of the present specification, this is merely illustrative of the technical idea of one embodiment of the present disclosure. In other words, since an ordinary skilled person in the art to which the embodiments of the present disclosure pertain may make various modifications and changes by changing the order described in the flowchart/timing diagram without departing from the essential characteristics of the present disclosure or performing in parallel one or more of the steps, the flowchart/timing diagram is not limited to a time-series order.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, those having ordinary skill should understand the scope of the present disclosure should not be limited by the above explicitly described embodiments but by the claims and equivalents thereof.

What is claimed is:

1. A method of detecting a screen freeze error of a display device in a vehicle, the method comprising:

monitoring a drive pattern of at least one pixel in a porch area during a time period corresponding to a plurality of image frames, the porch area including at least one of a front porch area or a back porch area of a display panel driven according to the plurality of image frames; and determining that a screen of the display device is blackouted when the at least one pixel displays a specific RGB value.

2. The method of claim 1, wherein determining that the screen of the display device is blackouted includes:

determining that the screen of the display device is blackouted when the at least one pixel displays the specific RGB value during a time period corresponding to at least one image frame.

3. The method of claim 1, wherein determining that the screen of the display device is blackouted includes:

determining that the screen of the display device is blackouted when the at least one pixel displays an RGB value different from a preset RGB value.

4. The method of claim 1, further comprising:

comparing at least one of RGB information or cyclic redundancy check (CRC) information of pixels in the porch area with a preset value to determine an existence of a driven pixel in the porch area.

5. The method of claim 1, further comprising:

outputting a warning in accordance with the occurrence of the screen freeze error.

6. A device for detecting a screen freeze error of a display device in a vehicle, the device comprising:

a monitoring unit configured to monitor a drive pattern of at least one pixel in a porch area during a time period corresponding to a plurality of image frames, the porch area including at least one of a front porch area or a back porch area of a display panel driven according to the plurality of image frames; and a determining unit configured to that a screen of the display device is blackouted when the at least one pixel displays a specific RGB value.

7. A method for assisting detection of a screen freeze error of a display device in a vehicle, the method comprising:

generating a plurality of image frames including pixel data to be displayed by at least one pixel in a porch area including at least one of a front porch area and a back porch area of a display panel, wherein the display panel is driven according to the plurality of image frames, wherein it is determined that a screen of the display device is blackouted when the at least one pixel displays a specific RGB value; and providing the plurality of image frames to a driver circuit of the display panel.

* * * * *